United States Patent
Trivedi

(10) Patent No.: US 12,185,135 B2
(45) Date of Patent: Dec. 31, 2024

(54) PHYSICAL NETWORK FUNCTION DEVICE ACCESS CONTROL

(71) Applicant: Rakuten Mobile, Inc., Tokyo (JP)

(72) Inventor: Siddhartha Trivedi, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 0 days.

(21) Appl. No.: 17/628,223

(22) PCT Filed: Dec. 17, 2021

(86) PCT No.: PCT/US2021/064090
§ 371 (c)(1),
(2) Date: Jan. 19, 2022

(87) PCT Pub. No.: WO2023/113820
PCT Pub. Date: Jun. 22, 2023

(65) Prior Publication Data
US 2024/0040406 A1  Feb. 1, 2024

(51) Int. Cl.
*H04W 24/04* (2009.01)
*H04W 24/08* (2009.01)

(52) U.S. Cl.
CPC .......... *H04W 24/04* (2013.01); *H04W 24/08* (2013.01)

(58) Field of Classification Search
None
See application file for complete search history.

(56) References Cited

U.S. PATENT DOCUMENTS

2016/0306949 A1* 10/2016 Tallapaneni ............ G06F 21/10
2023/0066251 A1* 3/2023 Trim ................. H04W 28/0289

* cited by examiner

*Primary Examiner* — Frantz Bataille
(74) *Attorney, Agent, or Firm* — HAUPTMAN HAM, LLP

(57) ABSTRACT

Physical network function device access control is performed by detecting a communication failure between a Physical Network Function (PNF) device and a network maintenance server through a network, enabling a passive wireless receiver in response to detecting the communication failure, receiving an access request signal with the passive wireless receiver representing a request for access to the PNF device, and enabling, in response to validating the request for access, a wireless transceiver to establish communication with the PNF device.

20 Claims, 6 Drawing Sheets

PHYSICAL NETWORK FUNCTION DEVICE ACCESS CONTROL

RELATED APPLICATIONS

The present application is a National Phase of International Application No. PCT/US2021/064090, filed Dec. 17, 2021.

BACKGROUND

Physical Network Functions (PNFs) generally refer to functions or operations for networking performed by a dedicated or specialized hardware device. PNF devices include hardware radio units, radio distributed units, small-cell units, femtocells, wireless access points, routers, switches, firewalls, load balancers, or any other device with a dedicated or specialized network function. PNFs are generally contrasted with Virtualized Network Functions (VNFs), which are functions or operations for networking performed by a generic programmable computer. In a wide area network, such as a radio access network, PNF devices are utilized at many locations throughout the area of coverage, including remote locations. Radio access towers often have PNF devices mounted high off of the ground.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
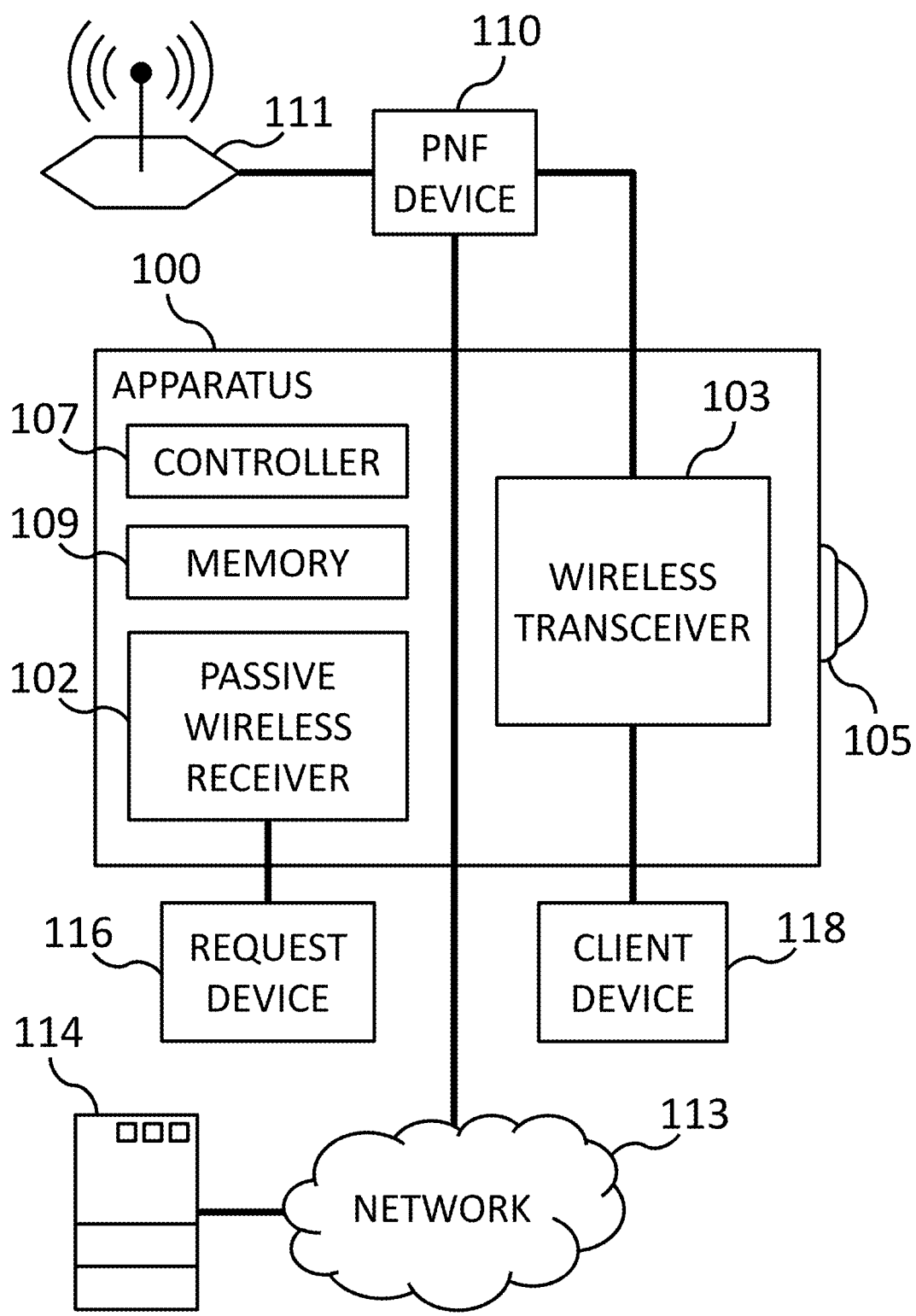
FIG. 1 is a schematic diagram of a system for physical network function device access control, according to at least some embodiments of the present invention.

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. In addition, the present disclosure may repeat reference numerals and/or letters in the various examples. This repetition is for the purpose of simplicity and clarity and does not in itself dictate a relationship between the various embodiments and/or configurations discussed.

PNF devices are generally designed to allow administrative access from devices or users of the network having proper credentials. Issues with PNF devices are resolved through the network using the administrative access. However, for issues with a PNF device's connection to the network, the PNF device is physically accessed. In cases where a PNF device, which is unreachable through the network, is located up a tower in a remote location, the amount of resources used to access the PNF device is a factor in determining the time until the issue is resolved.

Telecom network operators expend many resources to resolving physical access issues of PNF devices mounted up towers. For PNF device connectivity failure or software issues, Operations and Maintenance crews will climb the tower or use tools to reach or retrieve the PNF device, in order to make a physical connection with the device for configuration correction. Physical access to the device, or attaching cables, such as ETHERNET, Serial, or USB cables, to connect with an on-site device is complex and challenging under certain conditions.

At least some embodiments described herein reduce such resource expenditure for PNF device maintenance and repair. At least some embodiments herein include a multi-level secure access method to configure or restore the PNF device with backhaul or management connectivity to the network. In at least some embodiments, a tower-mounted PNF device is remotely accessed through a local passive wireless receiver, such as an infrared detector, and a local wireless connection, such as BLUETOOTH or WIFI. In at least some embodiments, once a PNF device makes a connection with a management system across the network, the PNF device disables all local access to restrict or prevent any unauthorized access.

In at least some embodiments, the PNF device is accessed using a local device such as a handheld scanner, a mobile telephone, a tablet, an unmanned aerial vehicle, etc. In at least some embodiments, an apparatus is integrated with the PNF device to establish and control connections with such local devices and further connect the PNF device to with network monitoring and maintenance systems to continue the configuration process.

At least some embodiments support manual configuration or auto-configuration, which activates in response to an instruction to integrate, update the device software, or perform maintenance activity for faulty conditions. In at least some embodiments, a remote connection is established by transmitting an infrared code of a PNF device serial number, predefined binary key, etc., to an infrared receiver, which then enables, for a preconfigured amount of time, a wireless connection. In at least some embodiments, the PNF device will enable the infrared receiver upon detecting a disconnection from the network, and wait for a specific bit sequence. Once the specific bit sequence is received the PNF device will power the wireless transceiver hardware, such as a BLUETOOTH module or WIFI module, for 2-way communication.

In at least some embodiments, an initial handshake with an authorization certificate authenticates access using the wireless connection. In at least some embodiments, signals detected by the wireless transceiver are logged. In at least some embodiments, an unmanned aerial vehicle flies to within infrared proximity of the PNF device, and maintains sufficient proximity, e.g., by hovering, while transmitting infrared red signals to activate the wireless connection, thereby providing access to a user on the ground and out of physical reach of the PNF device, but still within range of the wireless connection.

FIG. 1 is a schematic diagram of a system for physical network function device access control, according to at least some embodiments of the present invention. The system includes an apparatus 100, a PNF device 110, a base station 111, a network 113, a maintenance server 114, a requesting device 116, and a client device 118.

In at least some embodiments, base station 111 is a radio access point of a wide area radio access network. In at least some embodiments, base station 111 includes a radio antenna that is mounted up a multistory tower.

PNF device is located at base station 111, and is in communication with maintenance server 114 through network 113. In at least some embodiments, PNF device 110 performs a function for the radio access network of base station 111. In at least some embodiments, PNF device 110 is mounted up the radio antenna tower of base station 111. In at least some embodiments, PNF device 110 is accessed by maintenance server 114 for monitoring and updating. In at least some embodiments, maintenance server 114 is part of an Operations Support System (OSS).

Apparatus 100 is in communication with PNF device 110. In at least some embodiments, apparatus 100 is integrated with PNF device 110. In at least some embodiments, apparatus 100 is a standalone device connected or attached to PNF device 110. In at least some embodiments, apparatus 100 is configured to monitor the connection between PNF device 110 and network 113. In at least some embodiments, apparatus 100 is configured to provide a wireless connection to PNF device in response to an issue in the connection between PNF device 110 and maintenance server 114.

Apparatus 100 includes a passive wireless receiver 102, a wireless transceiver 103, a beacon 105, a controller 107, and a memory 109. In at least some embodiments, passive wireless receiver 102 includes at least one of an infrared receiver, a passive Near Field Communication (NFC) receiver, or any other receiver that can receive wireless signals without emitting wireless signals. In at least some embodiments, passive wireless receiver 102 includes a circuit powered by a Radio Frequency (RF) field. In at least some embodiments, wireless transceiver 103 is a WIFI access point or a BLUETOOTH transceiver. In at least some embodiments, wireless transceiver 103 has a larger bandwidth of communication than passive wireless receiver 102. In at least some embodiments, beacon 105 is a light, such as a light emitting diode, a light bulb, a liquid crystal display, a speaker, etc. In at least some embodiments, beacon 105 is configured to emit at least one of visible light, radio signals, or audible sound waves. In at least some embodiments, controller 107 includes a processor, programmable circuitry, or dedicated circuitry configured to perform operations for physical network function device access control. In at least some embodiments, a controller including circuitry configured to detect a communication failure between a Physical Network Function (PNF) device and a network server through a network, enable the passive wireless receiver in response to detecting the communication failure, receive an access request signal with the passive wireless receiver, wherein the access request signal represents a request for access to the PNF device, and enable, in response to validating the request for access, the wireless transceiver to establish communication with the PNF device. In at least some embodiments, memory 109 includes a non-volatile computer-readable medium capable of storing executable and non-executable data. In at least some embodiments, memory 109 is in communication with controller 107.

Requesting device 116 is configured to transmit signals that are detectable by passive wireless receiver 102. In at least some embodiments, requesting device 116 is configured to transmit an access request signal to the passive wireless receiver representing a request for access to the PNF device. In at least some embodiments, requesting device 116 includes an infrared emitter or an NFC transmitter configured to transmit signals readable by passive wireless receiver 102. In at least some embodiments, requesting device 116 is a handheld device, a mobile telephone, a tablet computer, a notebook computer, etc.

Client device 118 is configured to engage in bidirectional communication with wireless transceiver 103. In at least some embodiments, client device 118 is configured to establish communication with PNF device 110 through wireless transceiver 103. In at least some embodiments, client device 118 is a computing device, such as tablet computer, a notebook computer, a smartphone, or any other computing device including sufficient computational resources to perform issue resolution in communicating with PNF device 110 through wireless transceiver 103. In at least some embodiments, requesting device 116 and client device 118 are mounted to an unmanned aerial vehicle.

Figure 2:
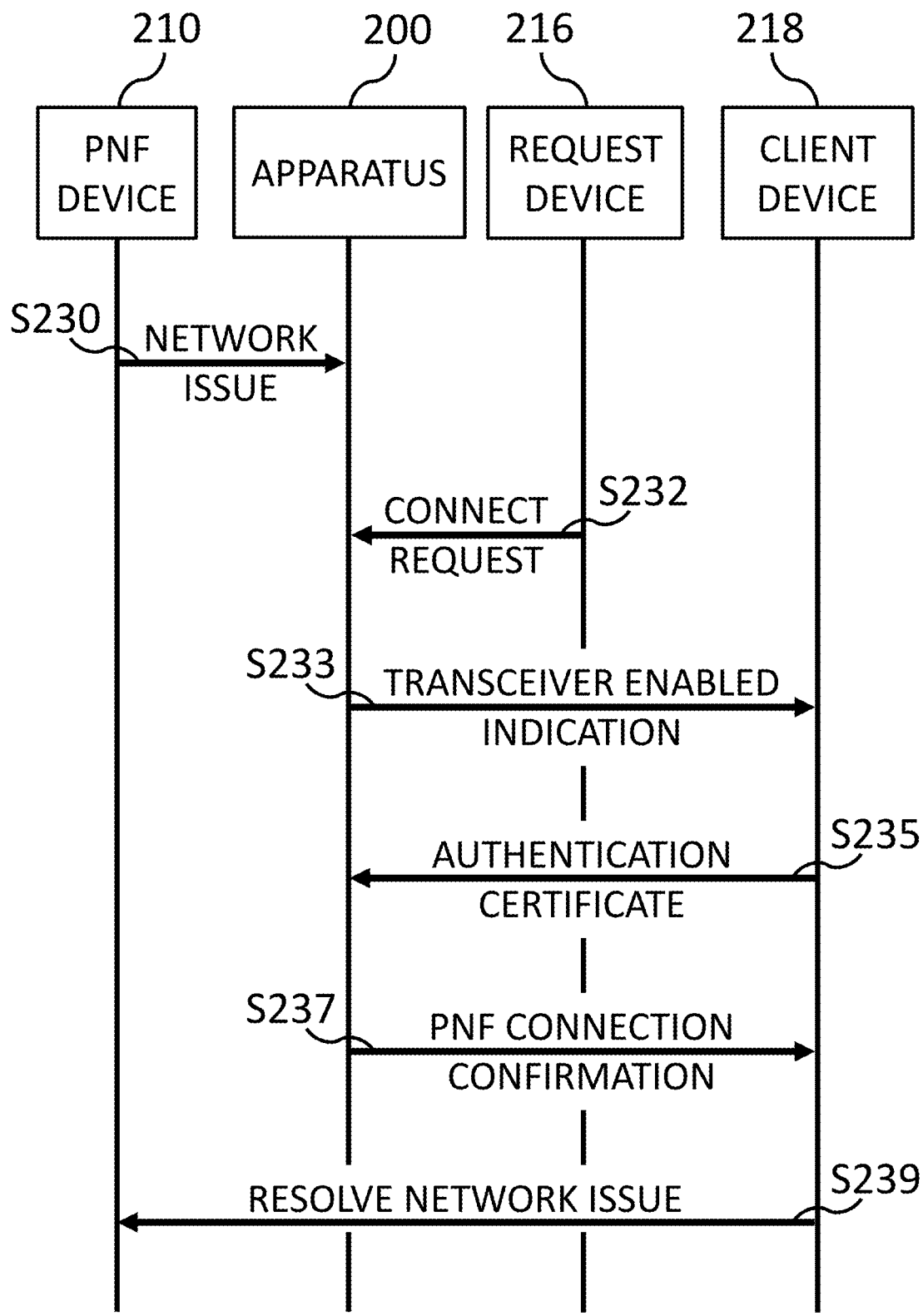
FIG. 2 is a communication flow for physical network function device access control, according to at least some embodiments of the present invention.

FIG. 2 is a communication flow for physical network function device access control, according to at least some embodiments of the present invention. The communication flow is conducted to perform a process of physical network function device access control. In at least some embodiments, the communication flow is conducted among a PNF device 210, an apparatus 200, a requesting device 216, and a client device 218.

At S230, apparatus 200 detects a network issue in PNF device 210. In at least some embodiments, apparatus 200 detects an issue in communication between PNF device 210 and a maintenance server. In at least some embodiments, apparatus 200 responds to the network issue detection by enabling a passive wireless receiver.

At S232, requesting device 216 transmits a connection request to apparatus 200 through the passive wireless receiver. In at least some embodiments, requesting device 216 transmits an infrared signal to an infrared receiver of apparatus 200. In at least some embodiments, requesting device 216 emits a magnetic field with an NFC transmitter within proximity of a passive NFC receiver of apparatus 200. In at least some embodiments, requesting device 216 transmits a code or sequence recognized by apparatus 200 as a request to enable a wireless transceiver.

At S233, apparatus 200 indicates that the wireless transceiver is enabled. In at least some embodiments, apparatus 200 activates a beacon that is detectable by client device 218, or a user of client device 218. In at least some embodiments, the beacon is configured to emit at least one of visible light, a radio signal, or an audible sound wave. In at least some embodiments, apparatus 200 causes the wireless transceiver to broadcast an access point identifier, such as a Service Set Identifier (SSID).

At S235, client device 218 transmits an authentication certificate to apparatus 200. In at least some embodiments, client device 218 transmits the authentication certificate as part of a handshake for connecting to the wireless transceiver. In at least some embodiments, client device 218 transmits the authentication certificate as part of a handshake for obtaining administrator access to PNF device 210, after connecting to the wireless transceiver. At S237, apparatus 200 confirms a connection between client device 218 and PNF device 210.

At S239, client device 218 resolves the network issue for PNF device 210. In at least some embodiments, client device 218 executes an automated routine on PNF device 210 to resolve the network issue. In at least some embodiments, a user of client device 218 interacts with PNF device 210 to determine a cause of the issue, and then input commands to resolve the issue. In at least some embodiments, client device 218 installs a new configuration, upgrades an operating system, configure radio units, backhauls a configuration, or performs a full system reset. In at least some embodiments, a client device mounted on an unmanned aerial vehicle executes an automated routine to resolve the network issue and restore communication between the PNF device and the maintenance server without user interaction.

Figure 3:
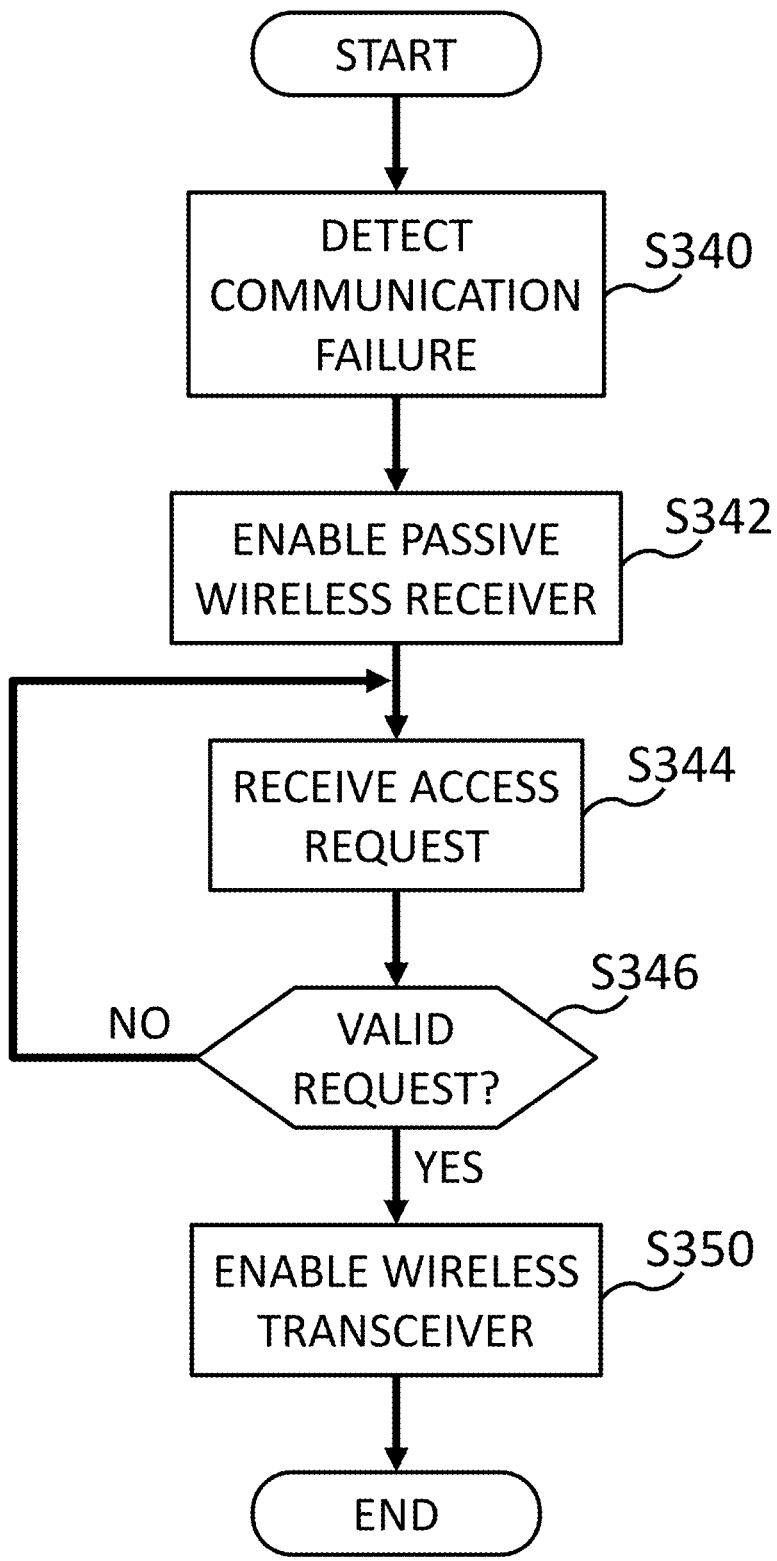
FIG. 3 is an operational flow for physical network function device access enablement, according to at least some embodiments of the present invention.

FIG. 3 is an operational flow for physical network function device access enablement, according to at least some embodiments of the present invention. The operational flow provides a method of physical network function device access enablement. In at least some embodiments, one or more operations of the method are executed by a controller of an apparatus including sections for performing certain operations, such as the controller and apparatus shown in FIG. 10, which will be explained hereinafter.

At S340, a detecting section or a sub-section thereof detects a communication failure from a PNF device. In at least some embodiments, the controller detects a communication failure between a PNF device and a network maintenance server through a network. In at least some embodiments, the controller monitors a flow of data packets between the PNF device and the network, and detects a failure in response to a cease in incoming data packs from the network. In at least some embodiments, the detecting section detects a lost contact with the maintenance server or misses a certain number of "keep-alive" or "Heartbeat" packets from the maintenance server. In at least some embodiments, the controller receives a notification from the PNF device of the communication failure. In at least some embodiments, the controller begins recording information of signals received by at least one of a passive wireless receiver or a wireless transceiver, the information including a time of reception and a substance of each signal. In at least some embodiments, as soon as the detecting section detects the communication failure, a recording section will start to collect status, logs, user records, etc., and once reconnected with the maintenance server will send local login alerts to the maintenance server with CA and device details, so that unauthorized access can be tracked.

At S342, an enabling section or a sub-section thereof enables a passive wireless receiver. In at least some embodiments, the controller enables a passive wireless receiver in response to detecting the communication failure. In at least some embodiments, the controller enables the passive wireless receiver by supplying power to the passive wireless receiver or a component thereof. In at least some embodiments, the controller enables the passive wireless receiver by monitoring signals received, and responding thereto. In at least some embodiments, once the PNF device has lost the connection with the maintenance server, then the enabling section will only enable the passive wireless receiver, and begin monitoring for valid input to proceed.

At S344, a communicating section or a sub-section thereof receives an access request through the passive wireless receiver. In at least some embodiments, the controller receives an access request signal with the passive wireless receiver representing a request for access to the PNF device. In at least some embodiments, the controller receives a device serial number, a secure code, a predefined binary sequence, etc. In at least some embodiments, a handheld device or an unmanned aerial vehicle with an infrared transmitter transmits a device serial number, secure code, or predefine binary sequence to enable the wireless transceiver, such as a BLUETOOTH transceiver or WIFI access point, to broadcast openly or in hidden mode. In at least some embodiments, the handheld device or the unmanned aerial vehicle sends an infrared signal "ENBTRDU123456789", which is further transferred by the infrared transmitter in a binary sequence ASCII/UTF-8: "01000101 01001110 01000010 01010100 01010010 01000100 01010101 00110001 00110010 00110011 00110100 00110101 00110110 00110111 00111000 00111001".

At S346, the controller or a section thereof determines whether the request received at S344 is valid. If the controller determines that the request is valid, then the operational flow proceeds to wireless transceiver enablement at S350. If the controller determines that the request is not valid, then the operational flow returns to access request reception at S344.

At S350, the enabling section or a sub-section thereof enables a wireless transceiver. In at least some embodiments, the controller enables, in response to validating the request for access, a wireless transceiver to establish communication with the PNF device. In at least some embodiments, the controller enables the wireless transceiver by supplying power to the wireless transceiver or a component thereof. In at least some embodiments, upon reception of the "enable" binary sequence, the enabling section activates the wireless transceiver to receive requests to communicate with the PNF device. In at least some embodiments, the wireless transceiver enablement proceeds as shown in FIG. 4, which will be explained hereinafter.

Figure 4:
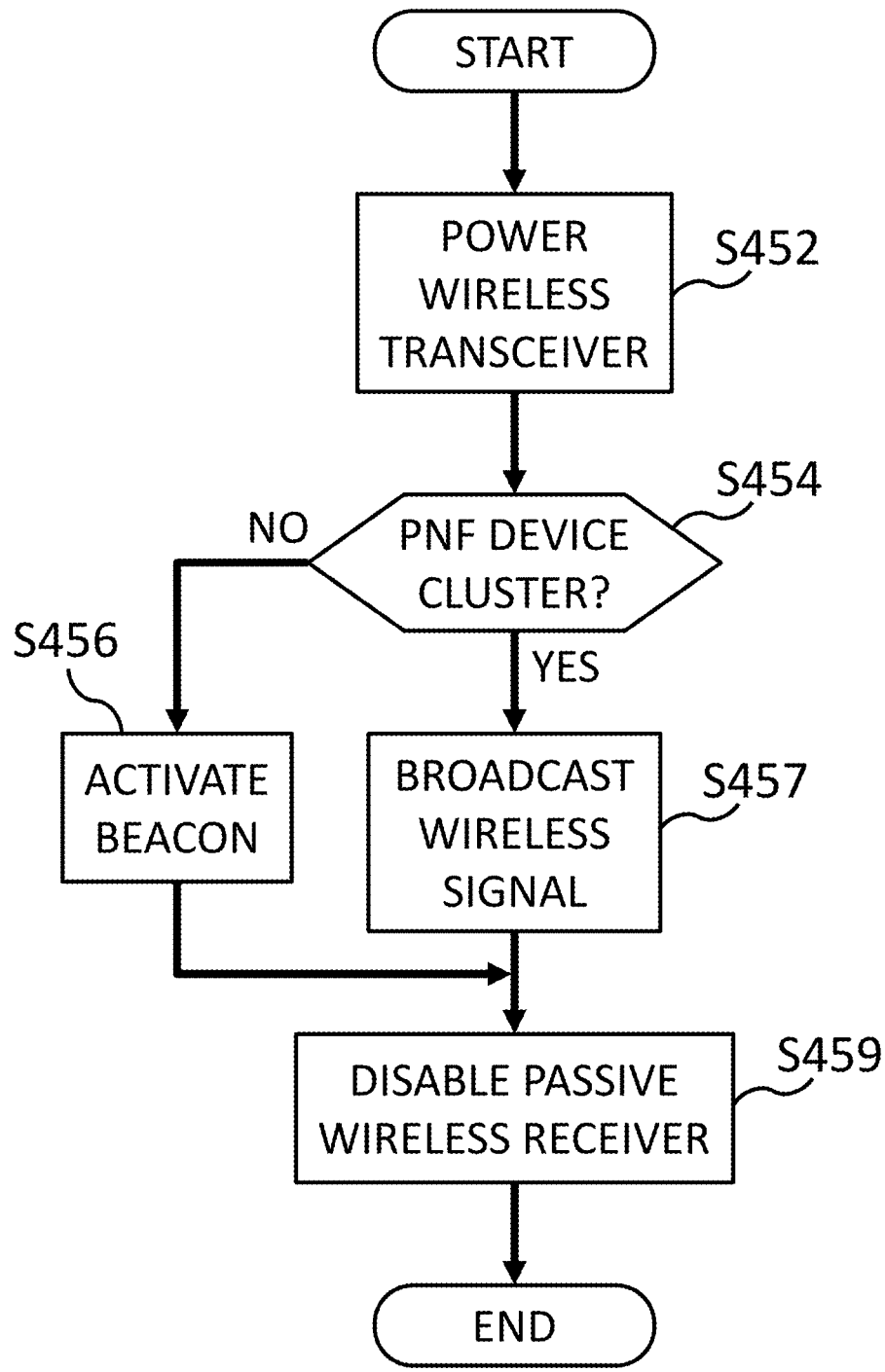
FIG. 4 is an operational flow for wireless transceiver enablement, according to at least some embodiments of the present invention.

FIG. 4 is an operational flow for wireless transceiver enablement, according to at least some embodiments of the present invention. The operational flow provides a method of wireless transceiver enablement. In at least some embodiments, one or more operations of the method are performed by an enabling section of a controller, such as the controller shown in FIG. 10, which will be explained hereinafter.

At S452, the enabling section or a sub-section thereof supplies power to the wireless transceiver or a component thereof. In at least some embodiments, the enabling section activates a circuit switch to connect the wireless transceiver to a power supply.

At S454, the enabling section or a sub-section thereof determines whether the PNF device is part of a cluster of PNF devices. In at least some embodiments, the enabling section determines whether there are other PNF devices mounted to the same antenna tower. In at least some embodiments, the enabling section determines whether the number of nearby PNF devices is greater than a threshold number. If the enabling section determines that the PNF device is not part of a cluster of PNF devices, then the operational flow proceeds to beacon activation at S456. If the enabling section determines that the PNF device is part of a cluster of PNF devices, then the operational flow proceeds to broadcasting at S457.

At S456, the enabling section or a sub-section thereof activates a beacon. In at least some embodiments, the enablement section activates a beacon in response to enabling the wireless transceiver. In at least some embodiments, the enabling section supplies power to the beacon. In at least some embodiments, the enabling section supplies pulses of power to the beacon. In at least some embodiments, the enabling section causes the beacon to perform a predetermined routine. In at least some embodiments, the enabling section activates lights or other indicators for power connection and other states of the device. In at least some embodiments, the enabling section causes a "yellow" LED to blink to indicate that the PNF device has a network issue, has a working power connection, and has an enabled passive wireless receiver.

At S457, the enabling section or a sub-section thereof broadcasts a wireless signal. In at least some embodiments, the enabling section causes the wireless transceiver to broadcast a signal in response to enabling the wireless transceiver. In at least some embodiments, the enabling section broadcasts a wireless signal including a data string. In at least some embodiments, the data string uniquely identifies the PNF device among other PNF devices in the cluster. In at least some embodiments, the enabling section causes the wireless transceiver to broadcast an SSID of a wireless access point. In at least some embodiments, the SSID/BT broadcast name is hidden to reduce exposure to nearby public receiver devices that may read the SSID/BT broadcast, yet allow operator to detect and communicate with the PNF device. In at least some embodiments, the enabling section causes a communication section to broadcast the wireless signal.

At S459, the enabling section or a sub-section thereof disables the passive wireless receiver. In at least some embodiments, the enabling section disables, in response to enabling the wireless transceiver, the passive wireless receiver. In at least some embodiments, the enabling section disables the passive wireless receiver by ceasing supply of power to the passive wireless receiver or a component thereof. In at least some embodiments, the enabling section disables the passive wireless receiver by ignoring any signals received.

In at least some embodiments, the determination of whether to broadcast a wireless signal or activate a beacon is based on other criteria. In at least some embodiments, the enabling section broadcasts a wireless signal and activates a beacon. In at least some embodiments, the enabling section does not disable the passive wireless receiver until a connection is made between the PNF device and a client device through the wireless transceiver.

Figure 5:
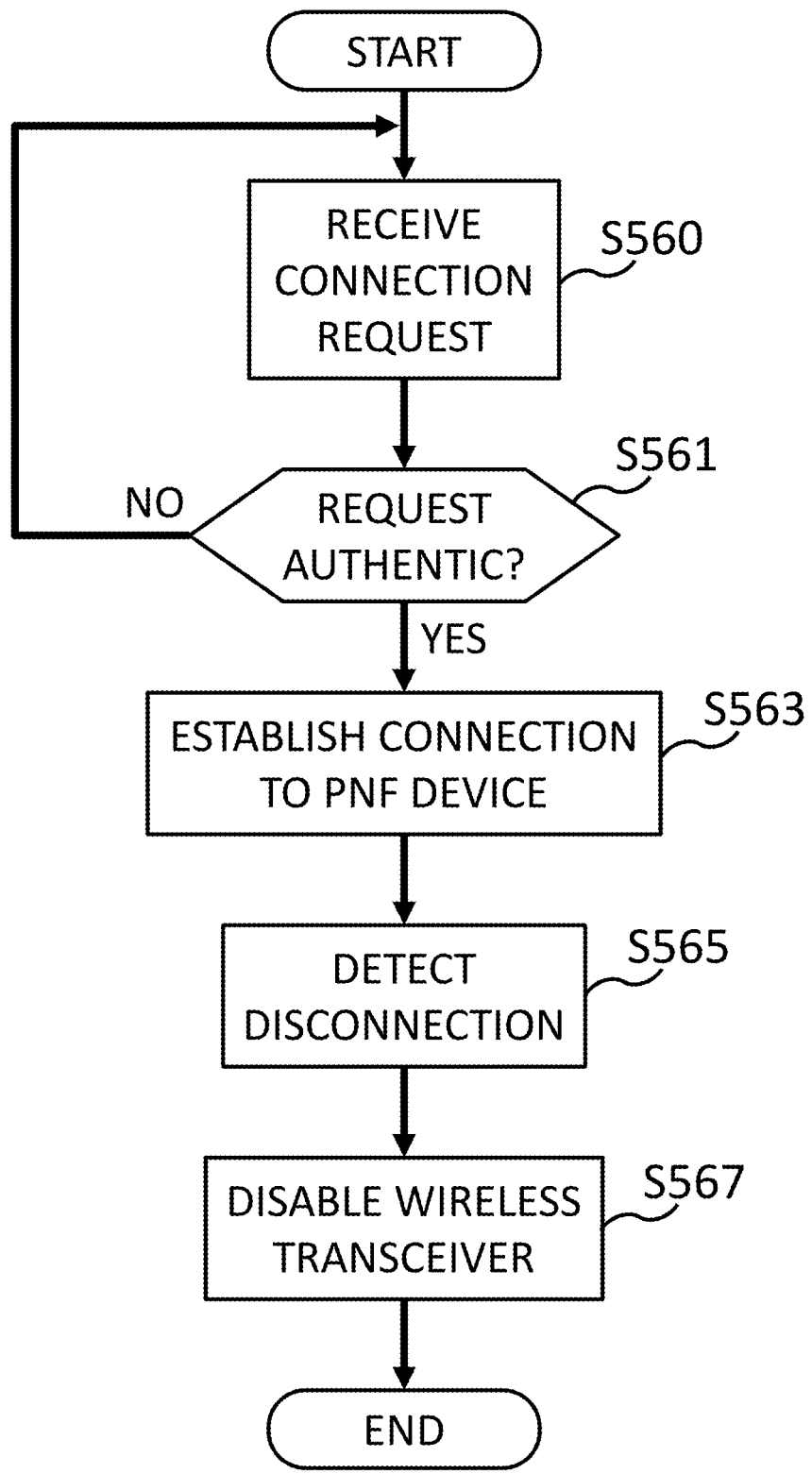
FIG. 5 is an operational flow for physical network function device access disablement, according to at least some embodiments of the present invention.

FIG. 5 is an operational flow for physical network function device access disablement, according to at least some embodiments of the present invention. The operational flow provides a method of physical network function device access disablement. In at least some embodiments, one or more operations of the method are performed by an enabling section and a communicating section of a controller, such as the controller shown in FIG. 10, which will be explained hereinafter.

At S560, a communicating section or a sub-section thereof receives a connection request. In at least some embodiments, the communicating section receives a request to connect to a PNF device. In at least some embodiments, the communication section receives a request to connect to a wireless access point. In at least some embodiments, the communicating section receives a connection request from a client device through the wireless transceiver.

At S561, the communicating section or a sub-section thereof determines whether the request is authentic. In at least some embodiments, the communication section determines whether a certificate of authenticity received from the client device is valid. In at least some embodiments, the client device, such as a handheld device or an unmanned aerial vehicle will exchange CA certificates with the PNF device, and authenticate themselves as valid master and client. If the communication section determines that the request is authentic, then the operational flow proceeds to connection establishment at S563. If the communication section determines that the request is not authentic, then the operational flow returns to request reception at S560. In at least some embodiments, the communicating section can restrict connections such that only certain device serial numbers are allowed, so that only a limited number of client devices are allowed to access the PNF device. In at least some embodiments, the communication section is configured to respond only to a set number of predefined client devices, such as a sequence of "ENBTRDU123456789" followed by "RAKU01", where RAKU01 fits within a predefine range along with RMI01, RAKU77, etc. In at least some embodiments, the communicating section accepts reconfiguration of the predefined client devices from a maintenance server only. In at least some embodiments, the communication section disables the wireless transceiver after three unauthenticated requests, until a binary sequence is received by the passive wireless receiver to re-enable the wireless transceiver. In at least some embodiments, the communication section activates the beacon according to a predefined sequence in response to three unauthenticated requests.

At S563, the communicating section or a sub-section thereof establishes a connection to the PNF device. In at least some embodiments, the communicating section establishes a connection between the client device and the PNF device through the wireless transceiver. In at least some embodiments, the communicating section establishes communication between the PNF device and a client device through the wireless transceiver. In at least some embodiments, the communicating section disables, in response to establishing communication, the passive wireless receiver. In at least some embodiments, the communicating section establishes a connection at an elevated access level to the PNF device, the level based on the certificate of authenticity, a client device identifier, etc. In at least some embodiments, once the CA certificate of the client device is authenticated, the communicating section grants the client device limited access to configure the PNF device, such as limited local input bandwidth, limited time, and limited areas of access inside the software of the PNF device. In at least some embodiments, permission among multiple levels of access are determined by the authorization certificate, each level defining what is able to be configured in the PNF device.

At S565, the communicating section or a sub-section thereof detects a disconnection from the PNF device. In at least some embodiments, the communicating section detects a disconnection of the client device from the PNF device. In at least some embodiments, the communicating section detects a disconnection between the client device and the PNF device through the wireless transceiver. In at least some embodiments, the communicating section receives notification from the wireless transceiver that the client device has disconnected.

At S567, the enabling section or a sub-section thereof disables the wireless transceiver. In at least some embodiments, the enabling section disables, in response to detecting the disconnection, the wireless transceiver. In at least some embodiments, the enabling section disables the wireless transceiver by ceasing supply of power to the wireless transceiver or a component thereof. In at least some embodiments, the enabling section disables the wireless transceiver in response to the controller detecting that communication has been restored between the PNF device and a network maintenance server. In at least some embodiments, once the PNF device has reconnected with the maintenance server, the enabling section disables all local communication, such as the passive wireless receiver and wireless transceiver, until a detecting section detects a lost contact with the maintenance server or misses a certain number of "keep-alive" or "Heartbeat" packets from the maintenance server.

Figure 6:
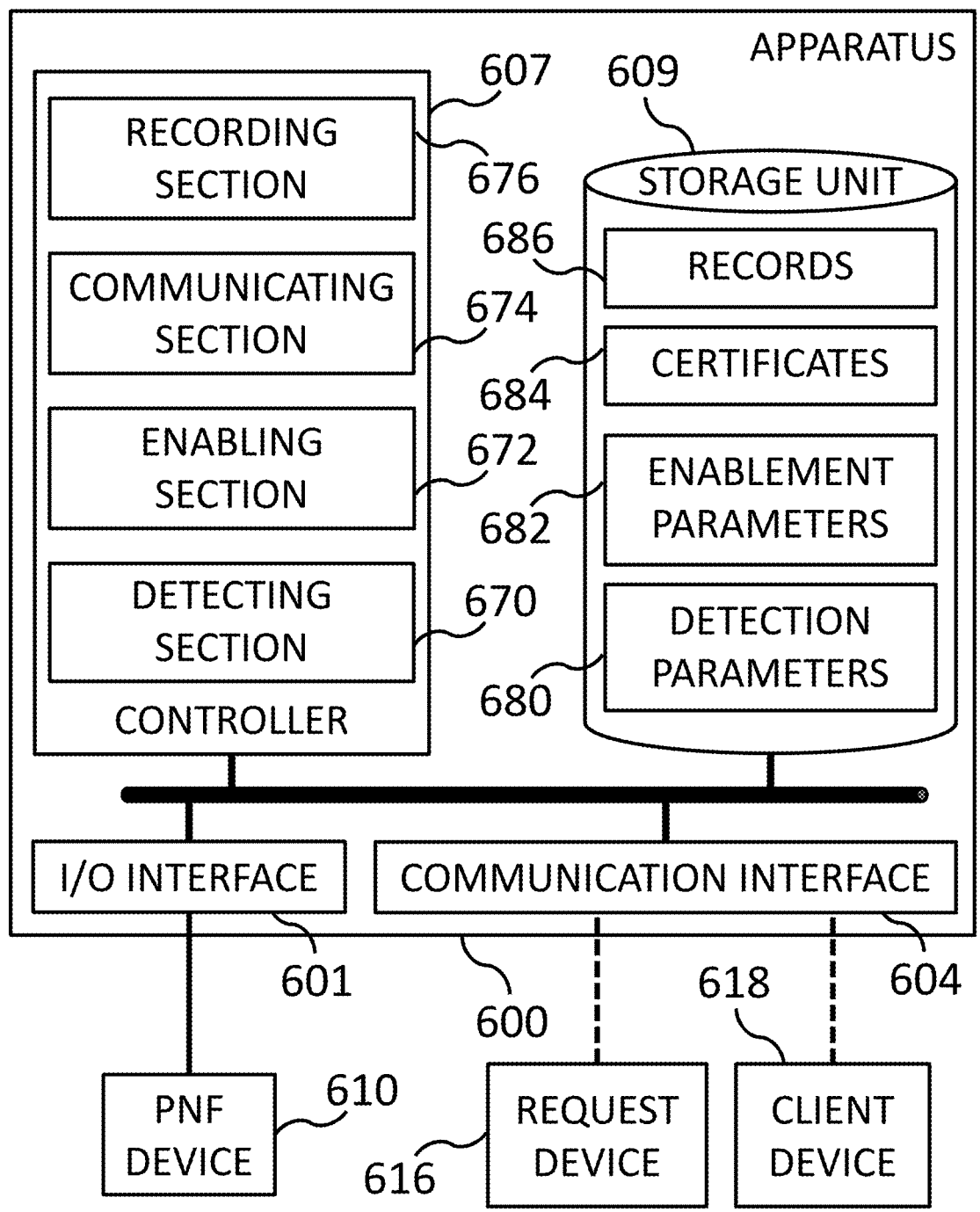
FIG. 6 is a block diagram of an exemplary hardware configuration for database model replacement by activation, according to at least some embodiments of the present invention.

FIG. 6 is a block diagram of a hardware configuration for physical network function device access control, according to at least some embodiments of the present invention.

The exemplary hardware configuration includes apparatus 600, which interacts with PNF device 610, receives signals from requesting device 616, and communicates with client device 618. In at least some embodiments, apparatus 600 is integrated with PNF device 610. In at least some embodiments, apparatus 600 is a computer system that executes computer-readable instructions to perform operations for physical network function device access.

Apparatus 600 includes a controller 607, a storage unit 609, a communication interface 604, and an input/output interface 601. In at least some embodiments, controller 607 includes a processor or programmable circuitry executing instructions to cause the processor or programmable circuitry to perform operations according to the instructions. In at least some embodiments, controller 607 includes analog or digital programmable circuitry, or any combination thereof. In at least some embodiments, controller 607 includes physically separated storage or circuitry that interacts through communication. In at least some embodiments, storage unit 609 includes a non-volatile computer-readable medium capable of storing executable and non-executable data for access by controller 607 during execution of the instructions. Communication interface 604 receives signals from requesting device 616, and transmits and receives data from client device 618. Input/output interface 601 connects to PNF device via a parallel port, a serial port, a keyboard port, a mouse port, a monitor port, and the like to exchange information.

Controller 607 includes detecting section 670, enabling section 672, communicating section 674, and recording section 676. Storage unit 609 includes detection parameters 680, enablement parameters 682, certificates 684, and records 686.

Detecting section 670 is the circuitry or instructions of controller 607 configured to detect communication failures and other network issues. In at least some embodiments, detecting section 670 is configured to detect a communication failure between a PNF device and a network maintenance server through a network. In at least some embodiments, detecting section 670 utilizes information in storage unit 609, such as detection parameters 680. In at least some embodiments, detecting section 670 includes sub-sections for performing additional functions, as described in the foregoing flow charts. In at least some embodiments, such sub-sections is referred to by a name associated with a corresponding function.

Enabling section 672 is the circuitry or instructions of controller 607 configured to control access to PNF device 610. In at least some embodiments, enabling section 672 is configured to enable and disable a passive wireless receiver and a wireless transceiver. In at least some embodiments, enabling section 672 utilizes information in storage unit 609, such as enablement parameters 682. In at least some embodiments, enabling section 672 includes sub-sections for performing additional functions, as described in the foregoing flow charts. In at least some embodiments, such sub-sections is referred to by a name associated with a corresponding function.

Communicating section 674 is the circuitry or instructions of controller 607 configured to facilitate communication between client device 618 and PNF device 610. In at least some embodiments, communicating section 674 is configured to establish communication between PNF device 610 and client device 618 through the wireless transceiver. In at least some embodiments, communicating section 674 utilizes information from storage unit 609, such as certificates 684. In at least some embodiments, communicating section 674 includes sub-sections for performing additional functions, as described in the foregoing flow charts. In at least some embodiments, such sub-sections is referred to by a name associated with a corresponding function.

Recording section 676 is the circuitry or instructions of controller 607 configured to record signals and data exchanged with PNF device 610. In at least some embodiments, recording section 676 is configured to record information of signals received by at least one of a passive wireless receiver or a wireless transceiver, the information including a time of reception and a substance of each signal. In at least some embodiments, recording section 676 records information to storage unit 609, such as in certificates 684. In at least some embodiments, recording section 676 includes sub-sections for performing additional functions, as described in the foregoing flow charts. In at least some embodiments, such sub-sections is referred to by a name associated with a corresponding function.

In at least some embodiments, the apparatus is another device capable of processing logical functions in order to perform the operations herein. In at least some embodiments, the controller and the storage unit need not be entirely separate devices, but share circuitry or one or more computer-readable mediums in some embodiments. In at least some embodiments, the storage unit includes a hard drive storing both the computer-executable instructions and the data accessed by the controller, and the controller includes a combination of a central processing unit (CPU) and RAM, in which the computer-executable instructions are able to be copied in whole or in part for execution by the CPU during performance of the operations herein.

In at least some embodiments where the apparatus is a computer, a program that is installed in the computer is capable of causing the computer to function as or perform operations associated with apparatuses of the embodiments described herein. In at least some embodiments, such a program is executable by a processor to cause the computer to perform certain operations associated with some or all of the blocks of flowcharts and block diagrams described herein.

At least some embodiments are described with reference to flowcharts and block diagrams whose blocks represent (1) steps of processes in which operations are performed or (2) sections of a controller responsible for performing operations. In at least some embodiments, certain steps and sections are implemented by dedicated circuitry, programmable circuitry supplied with computer-readable instructions stored on computer-readable media, and/or processors supplied with computer-readable instructions stored on computer-readable media. In at least some embodiments, dedicated circuitry includes digital and/or analog hardware circuits and include integrated circuits (IC) and/or discrete circuits. In at least some embodiments, programmable circuitry includes reconfigurable hardware circuits comprising logical AND, OR, XOR, NAND, NOR, and other logical operations, flip-flops, registers, memory elements, etc., such as field-programmable gate arrays (FPGA), programmable logic arrays (PLA), etc.

In at least some embodiments, the computer readable storage medium includes a tangible device that is able to retain and store instructions for use by an instruction execution device. In some embodiments, the computer readable storage medium includes, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

In at least some embodiments, computer readable program instructions described herein are downloadable to respective computing/processing devices from a computer readable storage medium or to an external computer or external storage device via a network, for example, the Internet, a local area network, a wide area network and/or a wireless network. In at least some embodiments, the network includes copper transmission cables, optical transmission fibers, wireless transmission, routers, firewalls, switches, gateway computers and/or edge servers. In at least some embodiments, a network adapter card or network interface in each computing/processing device receives computer readable program instructions from the network and forwards the computer readable program instructions for storage in a computer readable storage medium within the respective computing/processing device.

In at least some embodiments, computer readable program instructions for carrying out operations described above are assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. In at least some embodiments, the computer readable program instructions are executed entirely on the users computer, partly on the users computer, as a stand-alone software package, partly on the users computer and partly on a remote computer or entirely on the remote computer or server. In at least some embodiments, in the latter scenario, the remote computer is connected to the users computer through any type of network, including a local area network (LAN) or a wide area network (WAN), or the connection is made to an external computer (for example, through the Internet using an Internet Service Provider). In at least some embodiments, electronic circuitry including, for example, programmable logic circuitry, field-programmable gate arrays (FPGA), or programmable logic arrays (PLA) execute the computer readable program instructions by utilizing state information of the computer readable program instructions to individualize the electronic circuitry, in order to perform aspects of the present invention.

While embodiments of the present invention have been described, the technical scope of any subject matter claimed is not limited to the above described embodiments. Persons skilled in the art would understand that various alterations and improvements to the above-described embodiments are possible. Persons skilled in the art would also understand from the scope of the claims that the embodiments added with such alterations or improvements are included in the technical scope of the invention.

The operations, procedures, steps, and stages of each process performed by an apparatus, system, program, and method shown in the claims, embodiments, or diagrams are able to be performed in any order as long as the order is not indicated by "prior to," "before," or the like and as long as the output from a previous process is not used in a later process. Even if the process flow is described using phrases such as "first" or "next" in the claims, embodiments, or diagrams, such a description does not necessarily mean that the processes must be performed in the described order.

According to at least some embodiments of the present invention, physical network function device access control is performed by detecting a communication failure between a Physical Network Function (PNF) device and a network maintenance server through a network, enabling a passive wireless receiver in response to detecting the communication failure, receiving an access request signal with the passive wireless receiver representing a request for access to the PNF device, and enabling, in response to validating the request for access, a wireless transceiver to establish communication with the PNF device.

Some embodiments include the instructions in a computer program, the method performed by the processor executing the instructions of the computer program, and an apparatus that performs the method. In some embodiments, the apparatus includes a controller including circuitry configured to perform the operations in the instructions.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A computer-readable medium including instructions executable by a computer to cause the computer to perform operations comprising:

detecting a communication failure between a Physical Network Function (PNF) device and a network server through a network;

enabling a passive wireless receiver in response to detecting the communication failure, the passive wireless receiver configured to receive wireless signals without emitting wireless signals;

receiving an access request signal, the access request signal transmitted by a requesting device mounted to an unmanned aerial vehicle, with the passive wireless receiver, wherein the access request signal represents a request for access to the PNF device; and enabling, in response to validating the request for access, a wireless transceiver to establish communication with the PNF device.

2. The computer-readable medium of claim 1, wherein the operations further comprise:
disabling, in response to enabling the wireless transceiver, the passive wireless receiver.

3. The computer-readable medium of claim 1, wherein the operations further comprise:
establishing communication between the PNF device and a client device through the wireless transceiver; and
disabling, in response to establishing communication, the passive wireless receiver.

4. The computer-readable medium of claim 3, wherein the operations further comprise:
detecting a disconnection of the client device from the PNF device; and
disabling, in response to detecting the disconnection, the wireless transceiver.

5. The computer-readable medium of claim 1, wherein the operations further comprise:
activating a beacon in response to enabling the wireless transceiver;
wherein the beacon is configured to emit at least one of visible light, a radio signal, or an audible sound wave.

6. The computer-readable medium of claim 1, wherein the operations further comprise:
causing the wireless transceiver to broadcast a signal in response to enabling the wireless transceiver.

7. The computer-readable medium of claim 1, wherein the passive wireless receiver includes at least one of an infrared receiver or a passive Near Field Communication (NFC) receiver.

8. The computer-readable medium of claim 1, wherein the passive wireless receiver includes a circuit powered by a Radio Frequency (RF) field.

9. The computer-readable medium of claim 1, wherein the operations further comprise:
recording information of signals received by at least one of the passive wireless receiver or the wireless transceiver, the information including a time of reception and a substance of each signal.

10. A method comprising: detecting a communication failure between a Physical Network Function (PNF) device and a network server through a network; enabling a passive wireless receiver in response to detecting the communication failure, the passive wireless receiver configured to receive wireless signals without emitting wireless signals; receiving an access request signal, the access request signal transmitted by a requesting device mounted to an unmanned aerial vehicle, with the passive wireless receiver, wherein the access request signal represents a request for access to the PNF device; and enabling, in response to validating the request for access, a wireless transceiver to establish communication with the PNF device.

11. The method of claim 10, further comprising:
disabling, in response to enabling the wireless transceiver, the passive wireless receiver.

12. The method of claim 10, further comprising:
establishing communication between the PNF device and a client device through the wireless transceiver; and
disabling, in response to establishing communication, the passive wireless receiver.

13. The method of claim 12, further comprising:
detecting a disconnection of the client device from the PNF device; and
disabling, in response to detecting the disconnection, the wireless transceiver.

14. The method of claim 10, further comprising:
activating a beacon in response to enabling the wireless transceiver;
wherein the beacon is configured to emit at least one of visible light, a radio signal, or an audible sound wave.

15. The method of claim 10, further comprising:
causing the wireless transceiver to broadcast a signal in response to enabling the wireless transceiver.

16. An apparatus comprising: a passive wireless receiver; a wireless transceiver; and a controller including circuitry configured to detect a communication failure between a Physical Network Function (PNF) device and a network server through a network; enable the passive wireless receiver in response to detecting the communication failure, the passive wireless receiver configured to receive wireless signals without emitting wireless signals; receive an access request signal, the access request signal transmitted by a requesting device mounted to an unmanned aerial vehicle, with the passive wireless receiver, wherein the access request signal represents a request for access to the PNF device; and enable, in response to validating the request for access, the wireless transceiver to establish communication with the PNF device.

17. The apparatus of claim 16, wherein the passive wireless receiver includes at least one of an infrared receiver or a passive Near Field Communication (NFC) receiver.

18. The apparatus of claim 16, wherein the passive wireless receiver includes a circuit powered by a Radio Frequency (RF) field.

19. The apparatus of claim 16, further comprising:
a memory in communication with the controller;
wherein the controller further includes circuitry configured to record information of signals received by at least one of the passive wireless receiver or the wireless transceiver, the information including a time of reception and a substance of each signal.

20. The apparatus of claim 16, wherein the controller further includes circuitry configured to:
establish communication between the PNF device and a client device through the wireless transceiver; and
disable, in response to establishing communication, the passive wireless receiver.

* * * * *